US012760547B2

(12) United States Patent
Wheeler

(10) Patent No.: US 12,760,547 B2
(45) **Date of Patent: *Oct. 13, 2026**

(54) PARKING SYSTEMS AND METHODS FOR PRE-CONFIGURING BAYS TO REDUCE VEHICLE RETRIEVAL TIME

(71) Applicant: Volley Automation, Inc., Denver, CO (US)

(72) Inventor: Tim Allan Wheeler, Cupertino, CA (US)

(73) Assignee: VOLLEY AUTOMATION, INC., Denver, CO (US)

( * ) Notice: Subject to any disclaimer, the term of this patent is extended or adjusted under 35 U.S.C. 154(b) by 246 days.

This patent is subject to a terminal disclaimer.

(21) Appl. No.: 18/787,547

(22) Filed: Jul. 29, 2024

(65) Prior Publication Data

US 2024/0384553 A1 Nov. 21, 2024

Related U.S. Application Data

(63) Continuation of application No. 17/724,802, filed on Apr. 20, 2022, now Pat. No. 12,071,784.

(51) Int. Cl.
*E04H 6/42* (2006.01)
*G06N 20/00* (2019.01)
(Continued)

(52) U.S. Cl.
CPC ............ *E04H 6/424* (2013.01); *G06N 20/00* (2019.01); *G08G 1/0129* (2013.01); *G08G 1/146* (2013.01); *G08G 1/148* (2013.01)

(58) Field of Classification Search
None
See application file for complete search history.

(56) References Cited

U.S. PATENT DOCUMENTS

| | | | |
|---|---|---|---|
| 9,383,755 | B2 | 7/2016 | Barwick et al. |
| 11,142,924 | B1 | 10/2021 | Cha |

(Continued)

FOREIGN PATENT DOCUMENTS

| | | | |
|---|---|---|---|
| CN | 213869161 | U | 8/2021 |
| WO | 2012021758 | A1 | 2/2012 |

(Continued)

OTHER PUBLICATIONS

International Search Report and Written Opinion pertaining to PCT/US2023/014219 dated Jun. 29, 2023, 10 Pages.

(Continued)

*Primary Examiner* — Jelani A Smith
(74) *Attorney, Agent, or Firm* — Dinsmore & Shohl LLP

(57) ABSTRACT

A parking system including a plurality of trays, a plurality of automated guided vehicles (AGVs) configured to transport the plurality of trays, a plurality of bays, and a controller. The controller is configured to determine a bay configuration ratio based on collected parking data, each bay being configured into one of an insert-ready state and a retrieve-ready state in accordance with the bay configuration ratio. When a bay is in the insert-ready state, a tray is placed within the bay and an outward-facing door of the bay is in an open position. When a bay is in the retrieve-ready state, the outward-facing door of the bay is in a closed position, an inward-facing door of the bay is in an open position, and no tray is positioned within the bay.

18 Claims, 8 Drawing Sheets

(51) Int. Cl.
*G08G 1/01* (2006.01)
*G08G 1/14* (2006.01)

(56) References Cited

U.S. PATENT DOCUMENTS

| | | | | |
|---|---|---|---|---|
| 11,787,303 | B2 | 10/2023 | Tachimoto | |
| 2002/0164234 | A1 * | 11/2002 | Haag | E04H 6/422 414/277 |
| 2013/0085596 | A1 | 4/2013 | Shani | |
| 2017/0226764 | A1 * | 8/2017 | Nussbaum | E04H 6/24 |
| 2020/0361707 | A1 | 11/2020 | Lindbo et al. | |
| 2021/0276542 | A1 | 9/2021 | Mizuno et al. | |
| 2022/0073059 | A1 | 3/2022 | Yamaura | |
| 2023/0136951 | A1 | 5/2023 | Wada et al. | |
| 2023/0339457 | A1 * | 10/2023 | Wheeler | B60W 30/06 |
| 2023/0340798 | A1 * | 10/2023 | Wheeler | E04H 6/424 |

FOREIGN PATENT DOCUMENTS

| | | | |
|---|---|---|---|
| WO | 2013096739 | A1 | 6/2013 |
| WO | 2015089163 | A1 | 6/2015 |
| WO | 2016030034 | A1 | 3/2016 |
| WO | 2016197610 | A1 | 12/2016 |
| WO | 2021237963 | A1 | 12/2021 |
| WO | 2022019274 | A1 | 1/2022 |

OTHER PUBLICATIONS

Robot parking systems (https://www.herculescarparking.com.au/product/agv) accessed on Mar. 25, 2022.

U.S. Appl. No. 17/724,802, filed Apr. 20, 2022, Tim Allan Wheeler.

European Search Report pertaining to Application No. 25202841.0 dated Jan. 28, 2026, 8 pages.

Office Action pertaining to Japanese Patent Application No. 2024-555031 dated Mar. 13, 2026, 13 pages.

* cited by examiner

PARKING SYSTEMS AND METHODS FOR PRE-CONFIGURING BAYS TO REDUCE VEHICLE RETRIEVAL TIME

CROSS-REFERENCE TO RELATED APPLICATION

This application is a continuation of co-pending U.S. patent application Publication Ser. No. 17/724,802, filed Apr. 20, 2022, for "Parking Systems And Methods For Pre-Configuring Bays To Reduce Vehicle Retrieval Time," which is hereby incorporated by reference in its entirety including the drawings.

TECHNICAL FIELD

The present specification generally relates to systems and methods for reducing the time necessary to retrieve a vehicle from a parking garage and, more specifically, systems and methods for determining parking spaces for vehicles based on vehicle pick up times.

BACKGROUND

Conventional parking garages are transforming the landscape to meet the demand for high capacity storage. In urban centers, where space above and below ground is at a premium, the owner of a parking facility is constrained by a fixed footprint and a certain amount of vertical space extending from such footprint. In new construction projects, an ability to park vehicles in a tightly packed configuration may provide a significant cost savings for the project. In existing garages, parking vehicles more tightly can result in increased revenue from increased parking volume or open up new opportunities in freed-up space.

A common approach to increasing parking density in existing garages is to hire human valets to manually park vehicles in tight configurations. However, valets are fundamentally limited by the steering dynamics of the vehicles, as well as the minimum spacing between vehicles necessary to allow for entry and exit. This limits the vehicle density that can be achieved. For new construction, mechanical parking systems such as stackers or rack and rail systems can increase density. However, these systems are large, expensive mechanical systems. As such, they require large upfront costs and are typically built into a building design well in advance. Once installed, they tend to be very expensive and difficult to modify, remove, or replace.

To increase parking density, some vehicles may be "parked in". That is, some cars are parked behind others such that it is necessary to move multiple vehicles out of the way to retrieve certain vehicles. These extra vehicle movements increase the retrieval time of the parked-in vehicles, i.e., the time necessary to deliver the vehicle back to the owner.

Accordingly, a need exists for improved parking systems that overcome the need for human-related overhead and limitations of automobile steering dynamics and include the necessary decision making systems to efficiently retrieve vehicles with predictable wait times for all vehicles.

SUMMARY

In one embodiment, a parking system includes: a plurality of trays; a plurality of automated guided vehicles (AGVs) configured to transport the plurality of trays; a plurality of bays; and a controller configured to determine a bay configuration ratio based on collected parking data, each bay being configured into one of an insert-ready state and a retrieve-ready state in accordance with the bay configuration ratio, wherein when a bay is in the insert-ready state, a tray is placed within the bay and an outward-facing door of the bay is in an open position, wherein when a bay is in the retrieve-ready state, the outward-facing door of the bay is in a closed position, an inward-facing door of the bay is in an open position, and no tray is positioned within the bay.

In another embodiment, a parking system includes: a plurality of trays, each tray including a platform and a plurality of legs extending from the platform; a plurality of automated guided vehicles (AGVs) configured to engage a bottom surface of the platform of each tray and transport the tray; a plurality of bays, each bay including a base having a recess formed therein for receiving a tray; and a controller configured to determine a bay configuration ratio based on collected parking data, each bay being configured into one of an insert-ready state and a retrieve-ready state in accordance with the bay configuration ratio, wherein when a bay is in the insert-ready state, a tray is placed within the bay and an outward-facing door of the bay is in an open position, wherein when a bay is in the retrieve-ready state, the outward-facing door of the bay is in a closed position, an inward-facing door of the bay is in an open position, and no tray is positioned within the bay.

In yet another embodiment, a method includes: determining a bay configuration ratio based on collected parking data; and positioning a plurality of bays in one of an insert-ready state and a retrieve-ready state in accordance with the bay configuration ratio, wherein when a bay is in the insert-ready state, a tray is placed within the bay and an outward-facing door of the bay is in an open position, wherein when a bay is in the retrieve-ready state, the outward-facing door of the bay is in a closed position, an inward-facing door of the bay is in an open position, and no tray is positioned within the bay.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
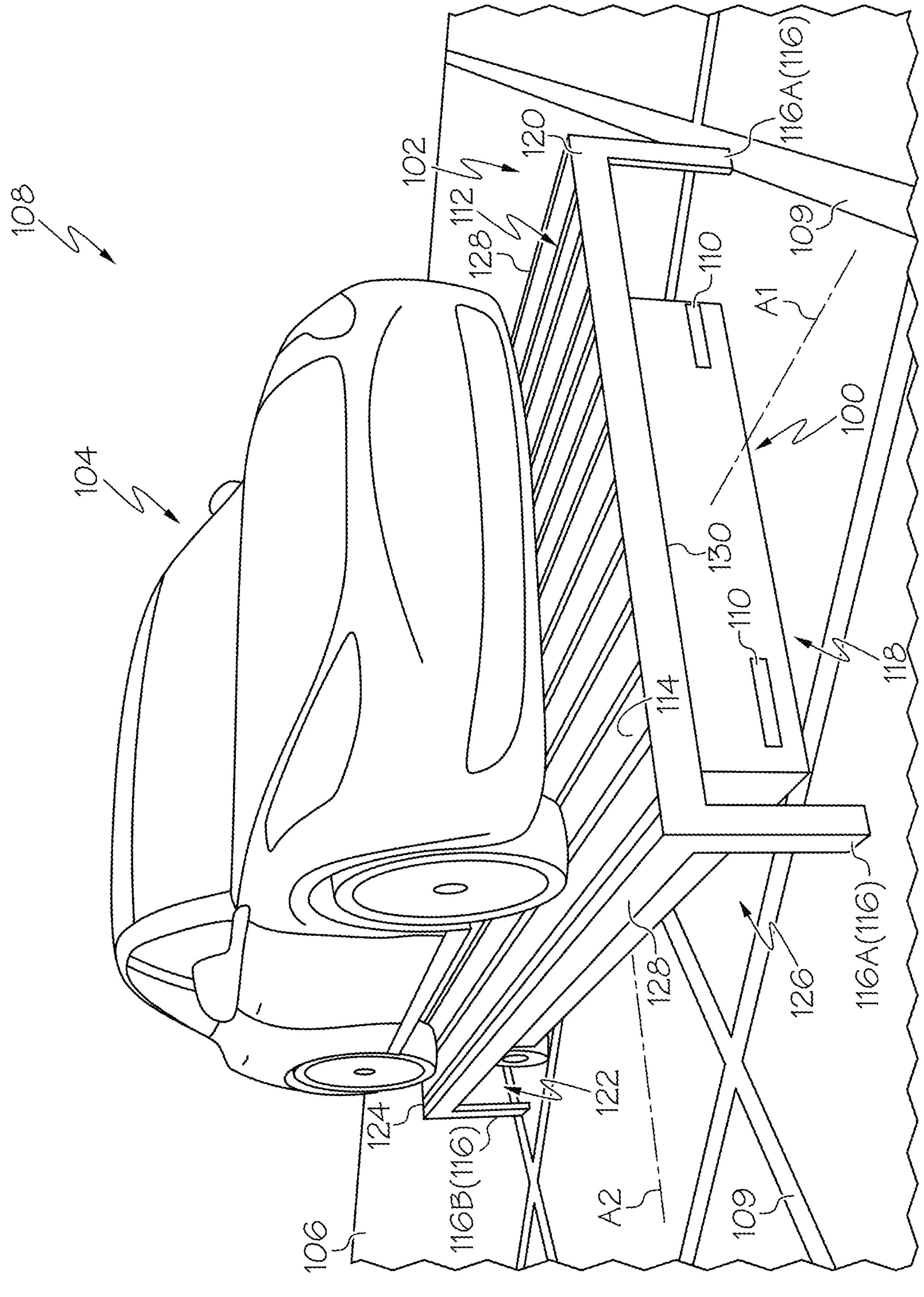
FIG. 1 schematically depicts a vehicle parked on a tray and transported by an automated guided vehicle along a floor surface of a parking garage, according to one or more embodiments shown and described herein.

Embodiments described herein are directed to systems and methods for the automated storage of vehicles or the like including a system that manages the scheduling and planning of storage and retrieval requests, and interacts with a system that transports a vehicle between an access location, such as a drive-up location/transfer point or bay, and an efficient storage location, such as a parking space within a parking garage.

In embodiments, a parking system includes a plurality of trays, a plurality of automated guided vehicles (AGVs) configured to transport the plurality of trays, a bay, and a controller configured to send instruction to an AGV to position a tray within the bay to receive a target vehicle in response to receiving a parking reservation from a user device, send instruction to one of the AGVs to navigate the target vehicle received within the bay to a target parking space, and send instruction to at least a subset of the AGVs to rearranging the tray carrying the target vehicle based on a pick up time indicated in the parking reservation.

Additionally, in embodiments, a parking system includes a plurality of trays, a plurality of AGVs configured to transport the plurality of trays, a plurality of bays, and a controller configured to determine a bay configuration ratio based on one or more parameters, each bay being configured into one of an insert-ready state or a retrieve-ready state in accordance with the bay configuration ratio, wherein when a bay is in the insert-ready state, a tray is placed within the bay and an outward-facing door of the bay is in an open position, and wherein when a bay is in the retrieve-ready state, the outward-facing door of the bay is in a closed position, an inward-facing door of the bay is in an open position, and no tray is positioned within the bay.

Various embodiments of the parking systems and the operation of the parking systems are described in more detail herein. Whenever possible, the same reference numerals will be used throughout the drawings to refer to the same or like parts.

Referring now to FIG. 1, an example AGV 100 is illustrated carrying a tray 102 on which a vehicle 104 is supported. In embodiments, the AGV 100 is an omnidirectional vehicle including omnidirectional wheels such as, for example, Mecanum wheels. As used herein, "omnidirectional vehicle" refers to any vehicle capable of moving in directions other than just a forward vehicle longitudinal direction and a rearward vehicle longitudinal direction. Specifically, the AGV 100 is capable of rotating about a central point of the AGV 100, moving in a sideways vehicle lateral direction, and moving in a diagonal direction by independently controlling the direction of rotation of the omnidirectional wheels of the AGV 100. However, it should be appreciated that the AGV 100 may be any other suitable vehicle and not limited to being an omnidirectional vehicle including omnidirectional wheels.

The AGV 100 includes one or more navigation sensors 110 configured to detect an object or obstacle to assist the AGV 100 in performing an autonomous driving command. As shown in FIG. 1, the AGV 100 traverses a floor surface 106 of a parking garage 108 which is provided with indicia 109 or any other suitable marking identifiable by the navigation sensor of the AGV 100 so that the AGV 100 may orient itself within the parking garage 108. As shown, the indicia 109 defines a grid on the floor surface 106 of the parking garage 108 identifying individual parking spaces in which trays 102 may be parked and also defines one or more paths between parking spaces for the AGV 100 to follow when moving between a bay 200 (FIG. 2) and a target parking space.

As shown in FIG. 1, the tray 102 includes a platform 112 having an upper surface 114 on which the vehicle 104 is initially parked, and a plurality of legs 116 extending from corners of the platform 112. The legs 116 of the tray 102 support the tray 102 on the floor surface 106 and define gaps through which the AGV 100 moves so as to be positioned under the platform 112 of the tray 102. Specifically, the tray 102 may include a pair of front legs 116A defining a front gap 118 at a front end 120 of the tray 102 so the AGV 100 may be positioned below the tray 102 through the front end 120 of the tray 102 along a first axis A1, and a pair of rear legs 116B defining a rear gap 122 at a rear end 124 of the tray 102 so the AGV 100 may be positioned below the tray 102 through the rear end 124 of the tray 102 along the first axis A1. The pair of front legs 116A and the pair of rear legs 116B also define a pair of side gaps 126 at opposite sides 128 of the tray 102 so the AGV 100 may be positioned below the tray 102 through the sides 128 of the tray 102 along a second axis A2 transverse to the first axis A1. As such, in embodiments, the AGV 100 is dimensioned to be less than the front gap 118, the rear gap 122, and the side gaps 126.

The AGV 100 includes a lifting mechanism operable between a lowered position, in which the lifting mechanism does not engage the tray 102, an intermediate position in which the lifting mechanism engages or mates with the tray 102, and a raised position in which the lifting mechanism extends to raise the tray 102 off the floor surface 106. Specifically, when the lifting mechanism is in the raised position, the lifting mechanism may engage a lower surface 130 of the platform 112 and is extended to lift the tray 102 off of the floor surface 106. In embodiments, the AGV 100 may include one or more tray sensors to detect when the AGV 100 is positioned below the tray 102 and, in response to determining that the lifting mechanism is positioned below the tray 102, activate the lifting mechanism to move from the lowered position to the raised position to raise the tray 102. Additionally, when the lifting mechanism is in the raised position and carrying the tray 102, the navigation sensor 110 of the AGV 100 may be utilized to determine that the AGV 100 is in a target location for the tray 102 to be positioned such as, for example, a target parking space or a bay 200, and, in response, activate the lifting mechanism to move from the raised position to the lowered position to lower the tray 102 onto the floor surface 106. However, it should be appreciated that the AGV 100 may be configured to engage and move a vehicle itself without use of a tray 102.

Figure 2:
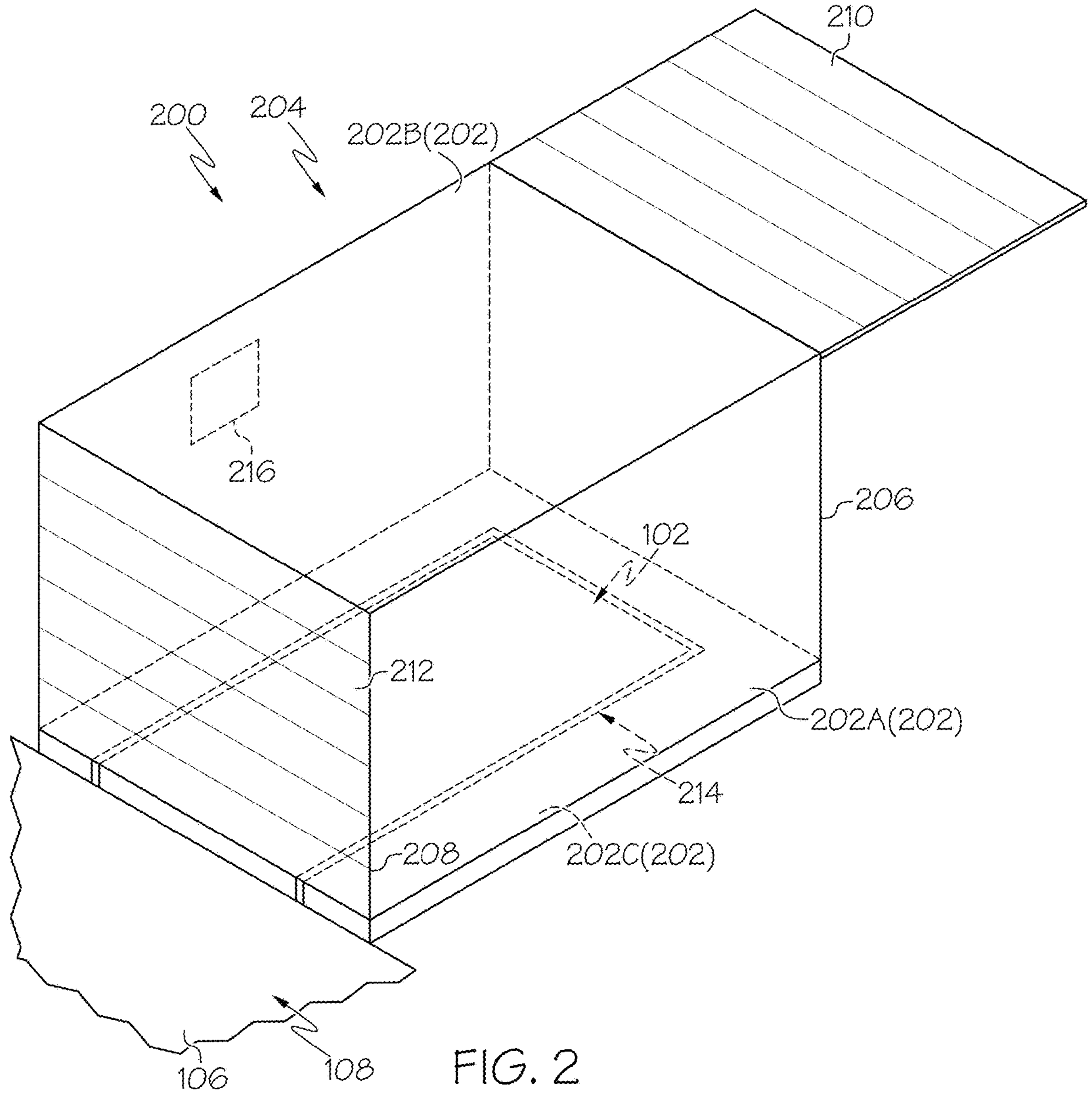
FIG. 2 schematically depicts a bay in an insert-ready state, according to one or more embodiments shown and described herein.
Figure 3:
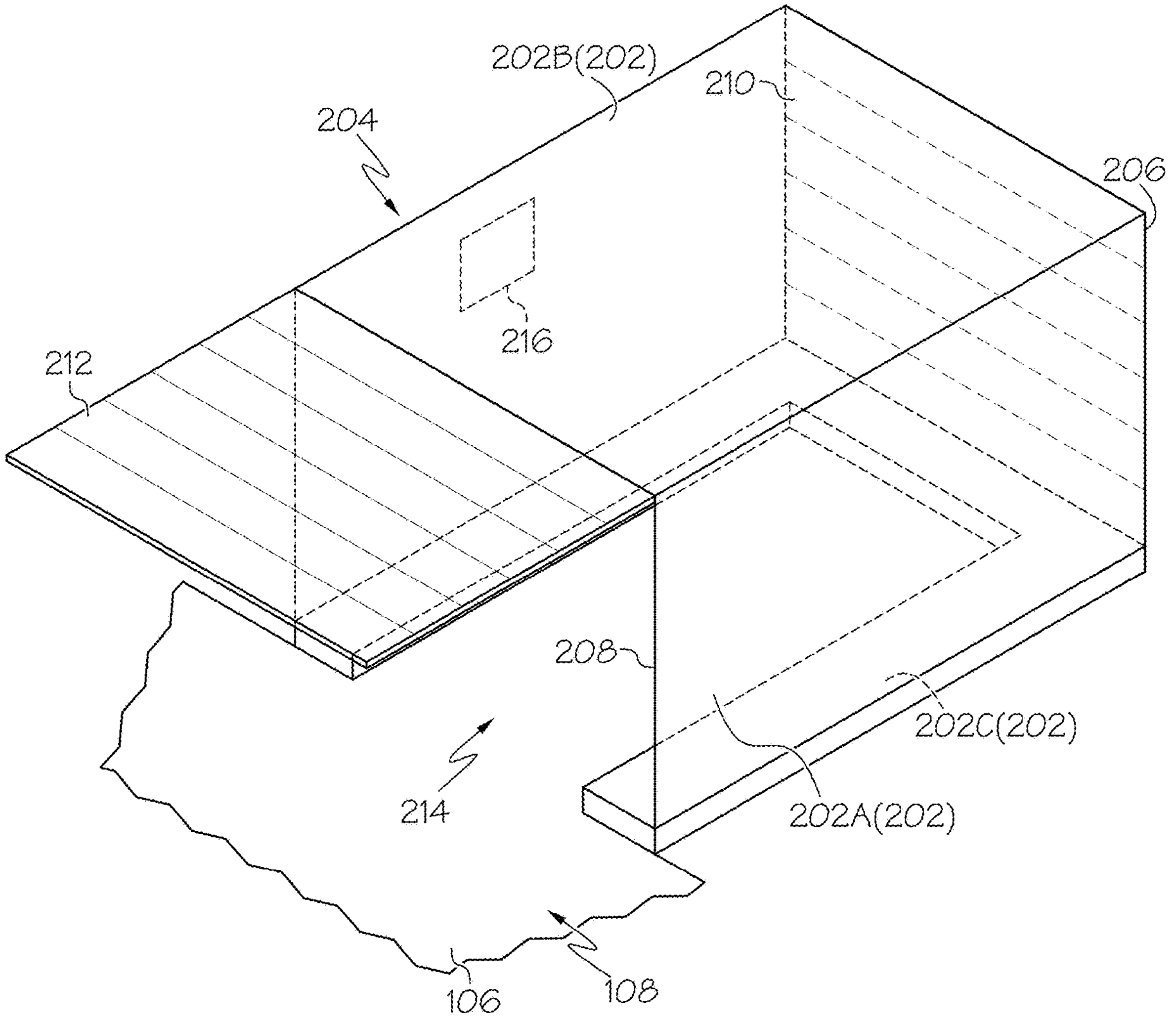
FIG. 3 schematically depicts the bay of FIG. 2 in a retrieve-ready state, according to one or more embodiments shown and described herein.

Referring now to FIGS. 2 and 3, a bay 200 is illustrated in an insert-ready state (FIG. 2) and a retrieve-ready state (FIG. 3). It should be appreciated that a plurality of bays 200 may be provided along a perimeter of the parking garage 108 or any other suitable location for receiving a vehicle to be parked in a parking space of the parking garage 108. In embodiments, the bay 200 includes a plurality of walls 202 defining an enclosure 204. Specifically, the bay 200 includes a pair of side walls 202A, a top wall 202B extending between the pair of side walls 202A, and a base 202C opposite the top wall 202B and extending between the pair of side walls 202A. The side walls 202A, the top wall 202B, and the base 202C define an open front end 206 and an open rear end 208 opposite the front end 206.

The bay 200 also includes a forward-facing door 210 provided at the front end 206 of the bay 200 and a rearward-facing door 212 provided at the rear end 208 of the bay 200. In embodiments, the forward-facing door 210 and the rearward-facing door 212 each extends between the pair of side walls 202A of the bay 200. However, in other embodiments, the forward-facing door 210 and the rearward-facing door 212 may be formed adjacent one another. The forward-facing door 210 and the rearward-facing door 212 are each positionable between an open position and a closed position. As shown in FIG. 2, the forward-facing door 210 is in the open position and the rearward-facing door 212 is in the closed position. Alternatively, as shown in FIG. 3, the rearward-facing door 212 is in the open position and the forward-facing door 210 is in the closed position. The forward-facing door 210 and the rearward-facing door 212 may be any suitable doors such as, for example, retractable doors extending from one or more of the side walls 202A, the top wall 202B, and the base 202C. In other embodiments, the forward-facing door 210 and the rearward-facing door 212 may be pivotable doors pivotally attached one or more of the side walls 202A, the top wall 202B, and the base 202C. As shown, the forward-facing door 210 and the rearward-facing door 212 are pivotally attached to the top wall 202B of the bay 200.

The bay 200 is oriented such that the rearward-facing door 212 is facing an interior of the parking garage 108 and the forward-facing door 210 is facing an opposite direction away from the interior of the parking garage 108. A recess 214 is formed in the base 202C of the bay 200 and open at the rear end 208 to receive an AGV 100 carrying a tray 102 within the recess 214. It should be appreciated that the base 202C of the bay 200 is elevated relative to the floor surface 106 of the parking garage 108 such that an AGV 100 may navigate through the open rear end 208 of the bay 200 when the rearward-facing door 212 is in the open position and lower the tray 102 within the recess 214. Once the tray 102 is lowered into the recess 214 provided in the base 202C of the bay 200, the upper surface 114 of the tray 102 is substantially flush with an upper surface of the base 202C of the bay 200. Accordingly, a vehicle, such as a vehicle to be dropped off by an owner to be parked, may be driven into the bay 200 through the open front end 206 of the bay 200 when the forward-facing door 210 is in the open position and onto the tray 102 positioned within the recess 214 of the base 202C of the bay 200. Thereafter, as described in more detail herein, the vehicle owner may exit the vehicle and the bay 200 so that the vehicle may be transported to a target parking space by the AGV 100.

However, in embodiments, it should be appreciated that an AGV 100 carrying a tray 102 may enter the bay 200 through the open rear end 208 of the bay 200 with the rearward-facing door 212 in the closed position. Specifically, the recess 214 formed in the base 202C of the bay 200 may be open at the rear end 208 of the bay 200 to allow for the AGV 100 carrying the tray 102 to move into the bay 200 under the rearward-facing door 212 and be positioned within the recess 214. In this embodiment, the rearward-facing door 212 may only be required to be positioned into the open position to allow for a vehicle to enter or exit the bay 200.

In embodiments, the bay 200 has one or more presence detection sensors 216 configured to detect the presence of a vehicle and/or person. In embodiments, the presence detection sensor 216 may also be configured to detect whether a person, such as the owner of the parking vehicle, is present within the bay 200 and prevent the AGV 100 from removing the tray 102 and thus the vehicle until it is determined that the person is no longer within the bay 200. In embodiments, the AGV 100 may be prevented from removing the tray 102 and vehicle until it is determined that the forward-facing door 210 is in the closed position such that no other person may enter the bay 200 and risk injury by falling into the recess 214 formed in the base 202C of the bay 200.

As discussed herein, the bay 200 is configurable into either the insert-ready state or the retrieve-ready state. As shown in FIG. 2, the bay 200 is configured into the insert-ready state to be ready for a vehicle owner to park a vehicle within the bay 200 to be parked within the parking garage 108. Specifically, when in the insert-ready state, a tray 102 is positioned within the recess 214 formed in the base 202C of the bay 200, the forward-facing door 210 of the bay 200 is in the open position, and the rearward-facing door 212 is in the closed position. Thus, a vehicle may be driven into the bay 200 and parked on the tray 102 without any additional configuration required prior to permitting the vehicle to enter the bay 200. In embodiments, an AGV 100 may be already positioned under the tray 102 so that the tray 102 may be removed from the bay 200 immediately after the vehicle is parked on the tray 102 and it is determined that the owner of the vehicle has exited the bay 200.

Alternatively, as shown in FIG. 3, the bay 200 is configured into the retrieve-ready state to be ready for an AGV 100 to move a tray 102 carrying a vehicle into the bay 200 to be retrieved by the owner. Specifically, when in the retrieve-ready state, no tray 102 is positioned within the recess 214 formed in the base 202C of the bay 200, the forward-facing door 210 of the bay 200 is in the closed position to prevent any vehicle from entering the bay 200 from outside the parking garage 108, and the rearward-facing door 212 is in the open position. Thus, an AGV 100 may readily move a tray 102 carrying a vehicle into the bay 200 through the open rear end 208 without any modification to the configuration of the bay 200. This saves time in delivering a vehicle to the bay 200 and allowing the vehicle to be retrieved by the owner.

Figure 4:
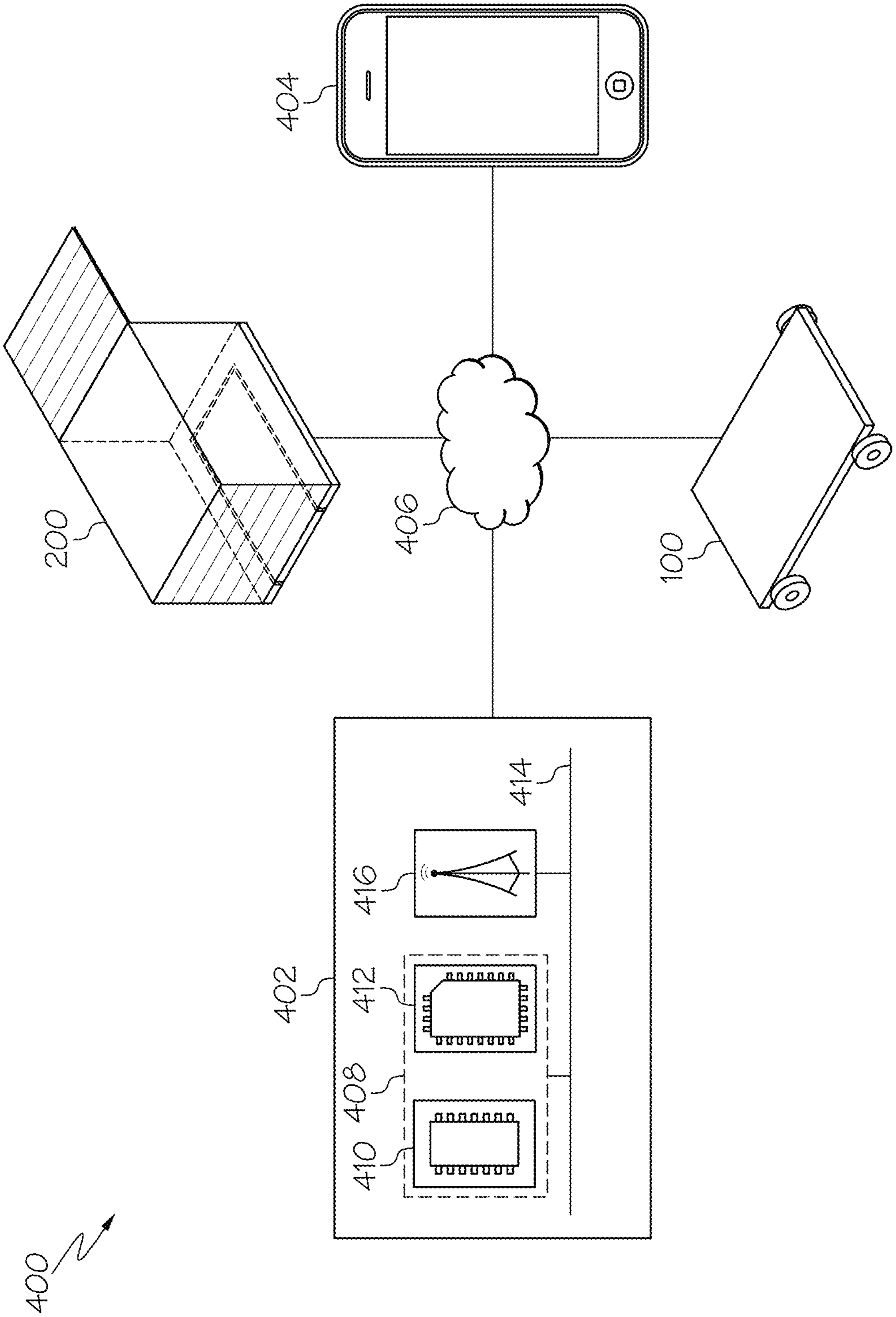
FIG. 4 schematically depicts components of a parking system, according to one or more embodiments shown and described herein.

Referring now to FIG. 4, a parking system 400 is shown generally including a central server 402, a bay 200, an AGV 100, and a user device 404. The central server 402, the bay 200, the AGV 100, and the user device 404 are configured to communicate with one another or at least with the central server 402 via a network 406. Although the parking system 400 is depicted as including only a single bay 200, AGV 100, and user device 404, it should be appreciated that the parking system 400 may include any number of bays 200, AGVs 100, and user devices 404 for communicating with the central server 402 via the network 406.

The central server 402 includes a controller 408 including one or more processors 410 and one or more memory modules 412. Each of the one or more processors 410 may be any device capable of executing machine readable and executable instructions. Accordingly, each of the one or more processors 410 may be an integrated circuit, a microchip, a computer, or any other computing device. The one or more processors 410 are coupled to a communication path 414 that provides signal interconnectivity between various modules of the central server 402. Accordingly, the communication path 414 may communicatively couple any number of processors 410 with one another, and allow the modules coupled to the communication path 414 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 414 may be formed from any medium that is capable of transmitting a signal such as, for example, conductive wires, conductive traces, optical waveguides, or the like. In some embodiments, the communication path 414 may facilitate the transmission of wireless signals, such as WiFi, Bluetooth®, Near Field Communication (NFC) and the like. Moreover, the communication path 414 may be formed from a combination of mediums capable of transmitting signals. In one embodiment, the communication path 414 comprises a combination of conductive traces, conductive wires, connectors, and buses that cooperate to permit the transmission of electrical data signals to components such as processors, memories, sensors, input devices, output devices, and communication devices. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

As noted above, the central server 402 includes one or more memory modules 412 coupled to the communication path 414. The one or more memory modules 412 may comprise RAM, ROM, flash memories, hard drives, or any device capable of storing machine readable and executable instructions such that the machine readable and executable instructions can be accessed by the one or more processors 410. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 412. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components. The one or more memory modules 412 may include machine readable instructions that, when executed by the one or more processors 410, cause the central server 402 to send instructions to one or more of a plurality of AGVs 100 for positioning a vehicle in a target parking space.

Still referring to FIG. 4, the central server 402 comprises network interface hardware 416 for communicatively coupling the central server 402 to the bay 200, the AGV 100, and the user device 404. The network interface hardware 416 can be communicatively coupled to the communication path 414 and can be any device capable of transmitting and/or receiving data via the network 406. Accordingly, the network interface hardware 416 can include a communication transceiver for sending and/or receiving any wired or wireless communication. For example, the network interface hardware 416 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 416 includes hardware configured to operate in accordance with the Bluetooth® wireless communication protocol.

Still referring to FIG. 4, the central server 402 may be communicatively coupled to the bay 200, the AGV 100, and the user device 404 by the network 406. In one embodiment, the network 406 may include one or more computer networks (e.g., a personal area network, a local area network, or a wide area network), cellular networks, satellite networks and/or a global positioning system and combinations thereof. Accordingly, the central server 402 can be communicatively coupled to the network 406 via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth®, Wireless USB, Z-Wave, ZigBee, and/or other near field communication protocols. Suitable cellular networks include, but are not limited to, technologies such as LTE, WiMAX, UMTS, CDMA, and GSM.

Referring still to FIG. 4, the bay 200, as well as any other bay 200 not illustrated herein, is communicatively coupled to the central server 402 via the network 406 and includes various sensors and network interface hardware, similar to the network interface hardware 416 of the central server 402. As discussed herein, the bay 200 may include one or more presence detection sensors 216 for identifying when an object such as a vehicle and/or a person is within the bay 200. The data detected by sensors, such as the presence detection sensors 216, may be transmitted to the central server 402 to determine a schedule for configuring the bay 200 into either the insert-ready state or the retrieve-ready state based on a predicted parking demand.

The AGV 100, as well as any other AGV 100 not illustrated herein, is communicatively coupled to the central server 402 via the network 406 and includes various sensors and network interface hardware, similar to the network interface hardware 416 of the central server 402. As such, the central server 402 sends instructions to the AGV 100 including instructions to move a tray 102 to a particular location so that vehicles within the parking garage 108 may be parked within a target parking space, or retrieved and delivered to a bay 200 to be picked up by the owner.

The user device 404 may be any suitable device such as a mobile device, for example, a cell phone, tablet, or other suitable computing device. In other embodiments, the user device 404 may be a fixed device provided outside or within the bay 200. In any event, the user device 404 is capable of receiving information regarding a parking reservation. The parking reservation identifies that a vehicle owner intends to leave a vehicle to be parked within the parking garage 108. In embodiments, the parking reservation may be created as the vehicle is already within a bay 200 such that it is ready to be parked in a particular parking space within the parking garage 108. In other embodiments, the parking reservation may be created in advance and thus indicate a drop off time at which the vehicle will arrive at the bay 200 to be parked within the parking garage 108. As discussed in more detail herein, the parking reservation may include a pick up time at which the owner intends on picking up the vehicle. The parking reservation may be modified after the vehicle is parked within the parking garage 108 such as, for instance, if the owner desires to pick up the vehicle earlier than the previously indicated pick up time. In embodiments, the owner is permitted to pay for parking services through the user device as well as select and/or pay for additional services such as, for example, priority preferences. When the owner selects the priority preferences, the central server 402 will prioritize instructions to retrieve the owner's vehicle ahead of other owners that have not selected the priority preferences.

Figure 5:
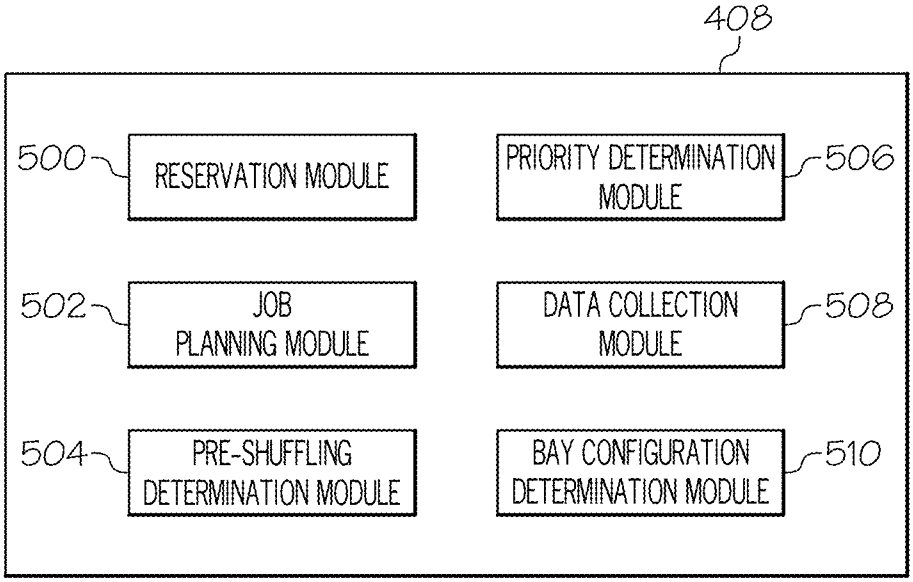
FIG. 5 schematically depicts a controller of the parking system of FIG. 4, according to one or more embodiments shown and described herein.

Referring now to FIG. 5, the controller 408 of the central server 402 is shown. In embodiments, the controller 408 generally includes a reservation module 500, a job planning module 502, a pre-shuffling determination module 504, a priority determination module 506, a data collection module 508, and a bay configuration determination module 510.

As noted herein, the user device 404 allows a vehicle owner to create a parking reservation and transmit the parking reservation to the central server 402. Accordingly, the reservation module 500 receives the parking reservations, including the drop off time and the pick up time, from each user device 404. It should be appreciated that a pick up time may not be associated with each vehicle. In embodiments, the job planning module 502 is the decision-making system that plans the movement of the AGVs 100 and the actions of the bay 200 to complete provided jobs such as, for example, vehicle retrieve requests. Based on a length of time that the vehicle will be parked in the parking garage 108, i.e., the duration of time between the drop off time and the pick up time, a target parking space within the parking garage 108 may be determined. The length of time that the vehicle will be parked within the parking garage may directly correlate to a distance at which the vehicle is parked from the bay 200. For example, if the length of time is greater than 5 hours, the controller 408 may instruct an AGV 100 to park the vehicle in a target parking space further from the bay 200 than if the length of time were to be less than 5 hours. Alternatively, or in addition thereto, the length of time that the vehicle will be parked within the parking garage 108 may directly correlate to how "parked in" the vehicle will be. As discussed herein, the term "parked in" refers to a situation in which one or more vehicles will have to be moved in order to permit another vehicle to be retrieved. For example, if the length of time is greater than 5 hours, the controller 408 may instruct an AGV 100 to park the vehicle in a target parking space that is parked in by more vehicles than if the length of time were to be less than 5 hours. In embodiments, the pick up time stored within the reservation module 500 may be modified in response to receiving an updated pick up time from the user device 404. For example, a vehicle owner may utilize the user device 404 to indicate that the vehicle owner is on their way to pick up the vehicle. Accordingly, the reservation module 500 may update instructions to retrieve the vehicle sooner than originally anticipated in the manner discussed herein, which may update the schedule created by the job planning module 502.

Figure 6:
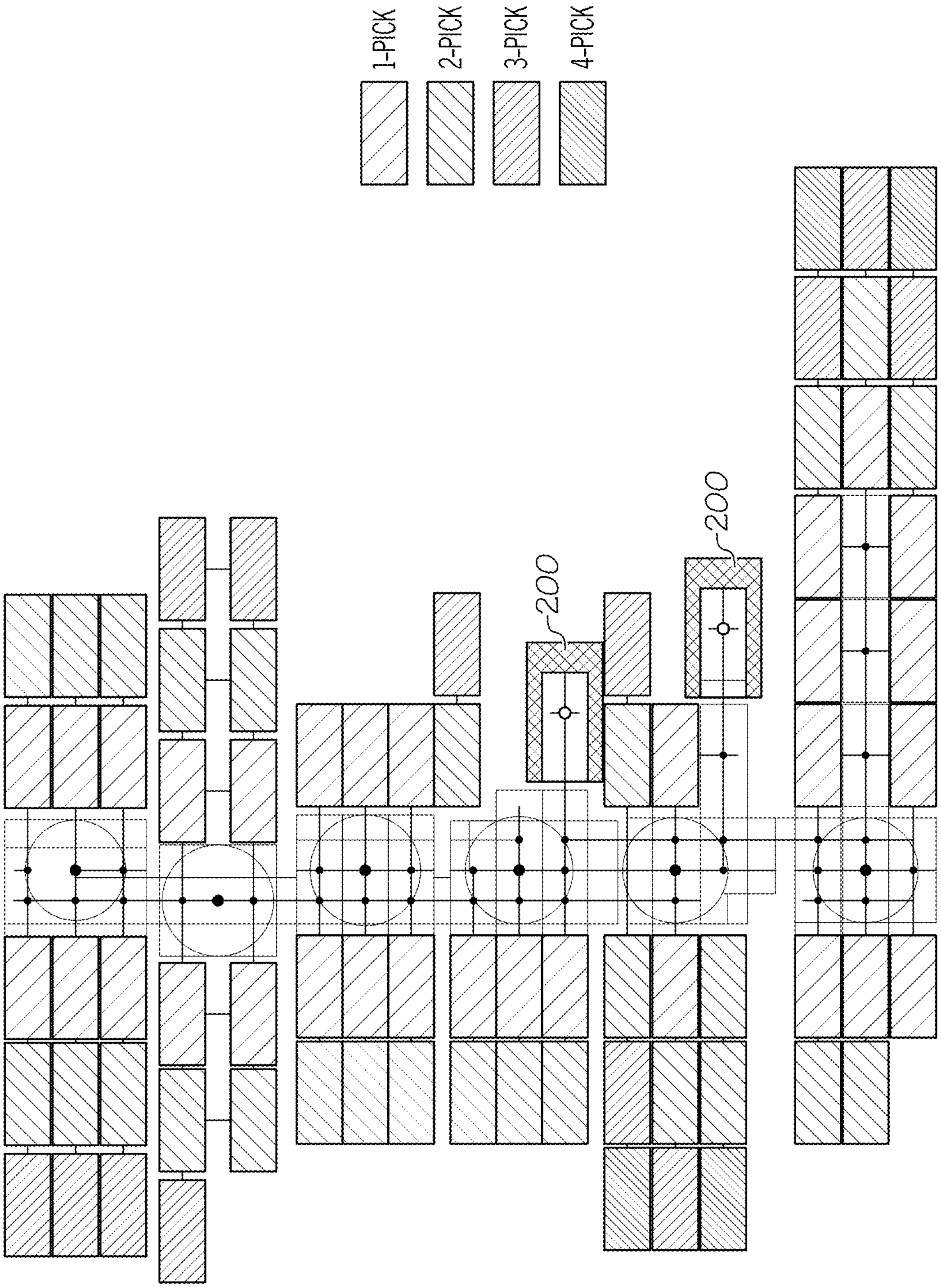
FIG. 6 schematically depicts a plurality of parking spaces of an example parking garage, according to one or more embodiments shown and described herein.

Referring now to FIG. 6, a diagram of the parking garage 108 is shown depicting a graphical representation of each of the parking spaces in the parking garage 108 and including two bays 200. As shown, each parking space is classified based on whether it is currently a 1-pick, 2-pick, 3-pick, or 4-pick parking space. A vehicle parked in a 1-pick parking space may be retrieved without requiring any other trays 102, which may or may not be carrying vehicles, to be moved out of the way. A vehicle parked in a 2-pick parking space will require one tray 102 to be moved out of the way so that the vehicle may be retrieved. A vehicle parked in a 3-pick parking space will require two trays 102 to be moved out of the way so that the vehicle may be retrieved. A vehicle parked in a 4-pick parking space will require three trays 102 to be moved out of the way so that the vehicle may be retrieved. It should be appreciated that, in a larger parking garage, parking spaces may be denoted as 5-pick, 6-pick, and the like. As the number of trays 102 required to be moved to retrieve a particular vehicle increases, the total time to retrieve the vehicle also increases. Therefore, those vehicles associated with a parking reservation that have a longer length of time to be parked within the parking garage may be parked-in more than those vehicles associated with a parking reservation that have a shorter length of time. It should be appreciated that the classification of each parking space may be changed in real-time based on movement of trays. Accordingly, for example, if a tray 102 parked in front of a 2-pick parking space is moved, the 2-pick parking space will change to a 1-pick parking space. Similarly, for example, if a tray 102 is parked in front of a 1-pick parking space, the 1-pick parking space will be changed to a 2-pick parking space.

Referring again to FIG. 5, the pre-shuffling determination module 504 is configured to identify a manner in which vehicles parked in the parking garage 108 should be rearranged based on a pick up time for a parked-in vehicle. For example, when the time remaining until a pick up time for a particular target vehicle parked in the parking garage 108 to be retrieved is less than a predetermined pick up time threshold, the pre-shuffling determination module 504 will determine a set of pre-shuffling instructions to be sent to one or more AGVs 100 to permit the target vehicle to be parked closer to one of the bays 200 for the remaining time until the pick up time. As a non-limiting example, the pre-shuffling instructions may include instructions sent to only a single AGV 100 to move the tray 102 carrying the target vehicle to an open parking space located closer to any bay 200. As another non-limiting example, the pre-shuffling instructions may include instructions sent to the AGV 100 to move the target vehicle directly into a bay 200 if it is determined that the remaining time is less than a predetermined bay storage time threshold. As another non-limiting example, the pre-shuffling instructions may include instructions sent to a plurality of AGVs 100 in which each AGV 100 is instructed to move an associated tray 102 out of a path of the target vehicle so that the target vehicle may be retrieved by another AGV 100 and moved to a target parking space closer to the bay 200 or, in embodiments, within the bay 200 itself. In embodiments, the pre-shuffling determination module 504 determines whether the target vehicle should be moved to a new parking space based on the time required to move the target vehicle to the new parking space and the time saved to deliver the target vehicle to the bay 200. For example, if the sum of the time required to move the target vehicle to the new parking space and the time required to move the target vehicle from the new parking space to the bay 200 is equal to or greater than the time required to move the target vehicle from the original parking space to the bay 200, the pre-shuffling determination module 504 will determine that it is not beneficial to move the target vehicle to the new parking space.

As discussed herein, a vehicle owner may operate the user device 404 to select or pay for priority preferences. This allows a vehicle to retrieve priority treatment over other vehicles or jobs such as those requiring navigation of other trays 102 not having or assigned priority preferences. For example, jobs may include reparking a tray 102, retrieving a vehicle, charging an AGV 100, and the like. Referring still to FIG. 5, the priority determination module 506 identifies a priority ranking of the vehicles parked within the parking garage 108 and permits instructions associated with those vehicles when a priority condition is satisfied. For example, if it is determined that two vehicles parked within the parking garage 108 each have the same pick up time, the vehicle having priority preferences selected by the owner via the user device 404 will be permitted to move closer to the bay 200 or into the bay 200 prior to the other vehicle that did not receive priority preferences. Similarly, if the pre-shuffling determination module 504 identifies a first set of instructions for pre-shuffling vehicles in the parking garage 108 to move a first target vehicle having priority preferences closer to a bay 200, and a second set of instructions for pre-shuffling vehicles in the parking garage 108 to move a second target vehicle without priority preferences closer to the bay 200, the first set of instructions will be carried out prior to the second set of instructions to permit the first target vehicle to be moved closer to the bay prior to the second target vehicle.

The data collection module 508 of the controller 408 receives parking data collected by the various sensors of each bay 200, such as the presence detection sensors 216. The data collection module 508 utilizes the collected parking data to determine trends with respect to requests to park a vehicle and requests to pick up a vehicle. In embodiments, the data collection module 508 associates the drop off time and pick up time of each parking reservation with a time of day, a day of the week, current weather, and other factors. The data collection module 508 utilizes this information to predict when more vehicles will being dropped off to be parked at the parking garage and when more vehicles will be requested to be retrieved. This information may be beneficial for preconfiguring the bays 200 into either the insert-ready state or the retrieve-ready state based on whether there is a higher demand from owners to park a vehicle or retrieve a vehicle. For instance, the data collection module 508 may determine that there is a higher demand for parking vehicles during the hours of 7:00 am and 9:00 am on weekdays such as when most people are arriving for work. Similarly, the data collection module 508 may determine that there is a higher demand for retrieving vehicles during the hours of 4:00 pm and 6:00 pm on weekdays such as when most people are leaving work. The data collection module 508 may utilize a machine learning algorithm for identifying such trends.

Based on the trends identified by the data collection module 508, the bay configuration determination module 510 will determine a bay configuration ratio in which a predetermined number of the bays 200 will be configured into the insert-ready state and a predetermined number of the bays 200 will be configured into the retrieve-ready state. For example, the bay configuration ratio may include a larger number of bays 200 configured into the insert-ready state than the number of bays 200 configured into the retrieve-ready state when the data collection module 508 identifies that there is a greater demand for vehicles being dropped off for parking than vehicles being picked up. Alternatively, the bay configuration ratio may include a larger number of bays 200 configured into the retrieve-ready state than the number of bays 200 configured into the insert-ready state when the data collection module 508 identifies that there is a greater demand for vehicles being picked up than vehicles being dropped off. The bay configuration determination module 510 may assign a specific configuration to each bay 200 based on the bay configuration ratio. Accordingly, in embodiments, a bay 200 that is assigned to be configured in a retrieve-ready state will repeatedly be configured into the retrieve-ready state after the bay 200 is utilized to receive a vehicle and the vehicle is parked in the parking garage 108. Similarly, in embodiments, a bay 200 that is assigned to be configured in an insert-ready state will repeatedly be configured into the insert-ready state after the bay 200 is utilized to deliver a vehicle to an owner. In other embodiments, it may be determined that it is not necessary to re-configure the bay 200 into the original determined configuration in instances in which another bay 200 may be readily configured into the necessary state and thus reestablish the bay configuration ratio. Moreover, it should be appreciated that the bay configuration ratio may change throughout the day based on changes in trends determined by the data collection module 508.

Figure 7:
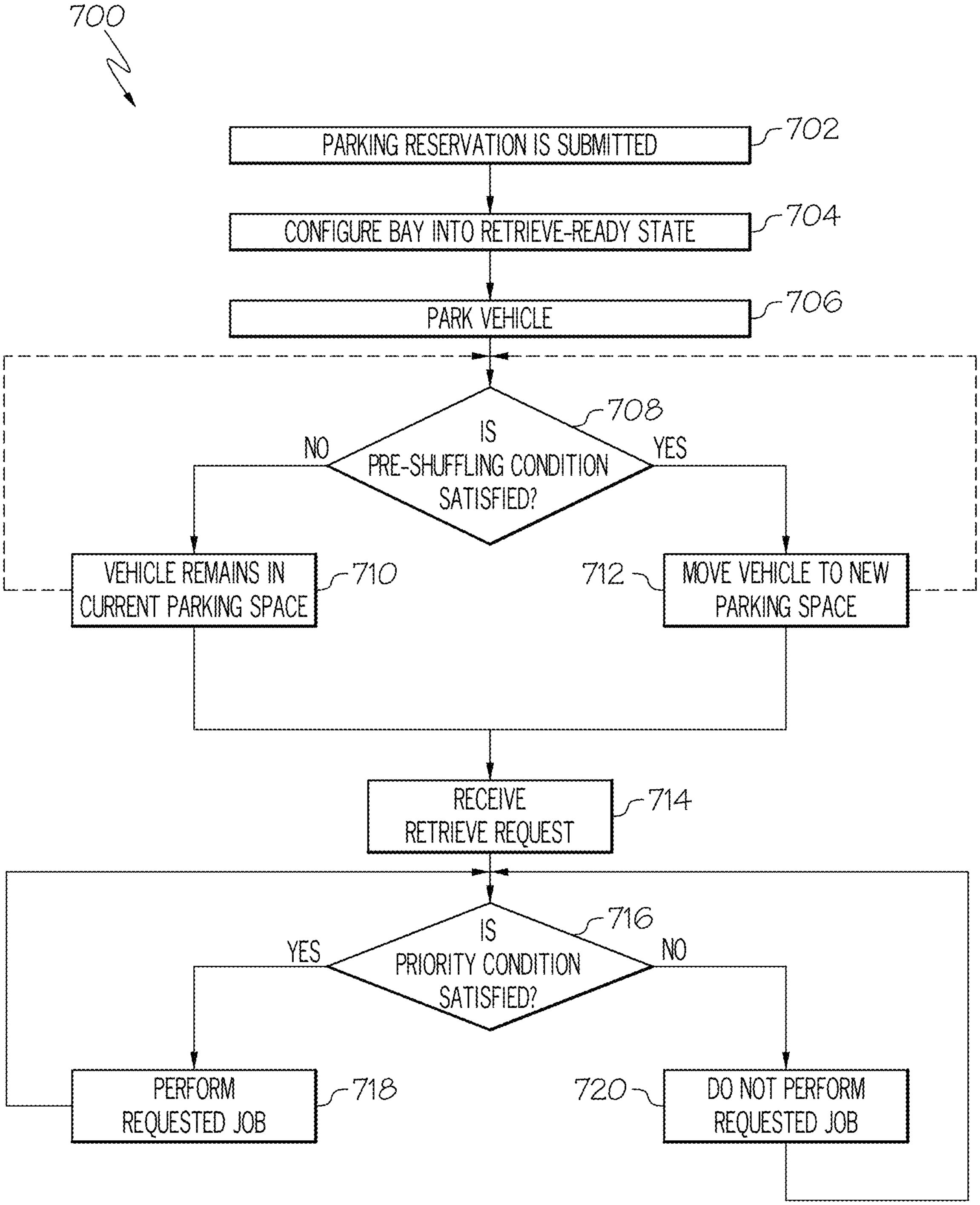
FIG. 7 depicts a flow diagram of a method for arranging vehicles within the parking garage, according to one or more embodiments shown and described herein.

Referring now to FIG. 7, a method 700 for determining a parking space for a target vehicle is depicted, according to one or more embodiments shown and described herein. The method 700 is described herein with reference to FIGS. 1-6. Initially, at step 702, the central server 402 receives a parking request from a user device 404. The parking request may be detected by the presence detection sensor 216 within the bay 200, generated by some other device within the bay 200, or created by the user device 404 prior to entering the bay 200 and identify a drop off time that the vehicle will arrive. The parking request is stored within the reservation module 500 of the central server 402. In any event, the method 700 proceeds to step 704 at which one of the bays 200 are configured into the retrieve-ready state, if not already in the retrieve ready state. In doing so, the central server 402 sends instruction to one of the AGVs 100 to move under a tray 102, activate the lifting mechanism to raise the tray 102 off the floor surface 106, and move the tray 102 toward the bay 200. In embodiments, the central server 402 also sends instruction to the bay 200 to position the rearward-facing door 212 into the open position such that the tray 102 may enter the bay 200. However, as discussed herein, it may be possible for the tray 102 to move under the rearward-facing door 212 while in the closed position and still enter the bay 200. Thus, the AGV 100 positions the tray 102 within the recess 214 formed in the base 202C of the bay 200. The central server 402 then instructs the bay 200 to position the rearward-facing door 212 into the closed position, if previously in the open position, and position the forward-facing door 210 into the open position so that the owner may drive the vehicle into the bay 200.

At step 706, once the presence detection sensors 216 within the bay 200 identify that the vehicle has been parked on the tray 102 and the owner has exited the bay 200, the forward-facing door 210 is positioned into the closed position, the rearward-facing door 212 is positioned into the open position, and the AGV 100 is instructed to move the vehicle, i.e., the target vehicle, into a target parking space. Specifically, the central server 402 submits a job request to the job planning module 502 to instruct the AGV 100 to move the tray 102 carrying the target vehicle to a particular target parking space. As discussed herein, the target parking space is based on the length of time the target vehicle will be parked in the parking garage 108, i.e., the length of time from the current time to the pick up time.

At step 708, the pre-shuffling determination module 504 of the central server 402 determines whether a pre-shuffling condition is satisfied. In embodiments, the pre-shuffling condition may be satisfied when the time remaining until the pick up time for the target vehicle is less than the predetermined pick up time threshold. If it is determined that the pre-shuffling condition is not satisfied at step 708, the method 700 proceeds to step 710 at which the target vehicle remains in the current target parking space. The method 700 then returns to step 708 until it is determined that the pre-shuffling condition is satisfied, at which time the method 700 proceeds to step 712 and the target vehicle is moved to a new parking space, i.e., a candidate parking space.

At step 712, the central server 402 sends a set of instructions to a plurality of the AGVs 100 to coordinate moving the target vehicle to a candidate parking space closer to the bay 200. As discussed herein, the set of instructions may include instructions sent to a plurality of AGVs 100 to move one or more trays 102 out of a moving path of the AGV 100 carrying the tray 102 on which the target vehicle is parked so that the target vehicle may be parked in the candidate parking space.

Thereafter, at step 714, when a retrieve request is received such as, for example, when a remaining time until the pick up time is below the predetermined bay storage time threshold or a specific retrieve request is received from a user device 404, the central server 402 determines that it may be appropriate to move the target vehicle into a bay 200. However, prior to moving the target vehicle into the bay 200, the method 700 proceeds to step 716 where the priority determination module 506 determine whether a priority condition is satisfied.

As discussed herein, the priority determination module 506 may create a plan for completing jobs such as, for example, reparking a tray 102, retrieving a vehicle, charging an AGV 100, and the like, such that the various jobs are completed in as little time as possible, while prioritizing those jobs that received a priority preference. More particularly, the priority determination module 506 may receive a plurality of jobs, create the plan for carrying out or completing the jobs, and execute the plan. The plan may be continually modified based on additional jobs received, updating pick up times received from a user device 404, and the like.

Specifically, at step 716, the priority condition may be satisfied, for example, if there are no other vehicles being moved into the same bay 200 at the same time such that there would be a scheduling conflict between vehicles in the bay 200. Another example in which the priority condition may be satisfied is if the target vehicle received priority preference over another vehicle that was intended to be moved into the same bay 200 at the same time. If so, the method 700 proceeds to step 718 at which the central server 402 sends instruction to an AGV 100 to perform the job, for example, move the tray 102 on which the target vehicle is parked into the bay 200. In the above example, the central server 402 also sends instruction to the bay 200 to be configured into the insert-ready state, if not already in the insert ready state. However, it should be appreciated that the priority determination module 506 continually determines whether the priority condition is satisfied, even during a current job. Accordingly, the method 700 may return to step 716 to continually determine that the priority condition is satisfied so that the job may continue to be carried out.

However, if it is determined at step 716 that the priority condition is not satisfied such as, for example, another vehicle has priority preference over the target vehicle, the method 700 proceeds to step 720 and the specific job is not completed, for example, the target vehicle remains in the current parking space, e.g., the target parking space or the candidate parking space if pre-shuffled. The process returns to step 716 until it is determined that the priority condition is satisfied such that the target vehicle may be moved into the bay 200 and retrieved by the owner.

Figure 8:
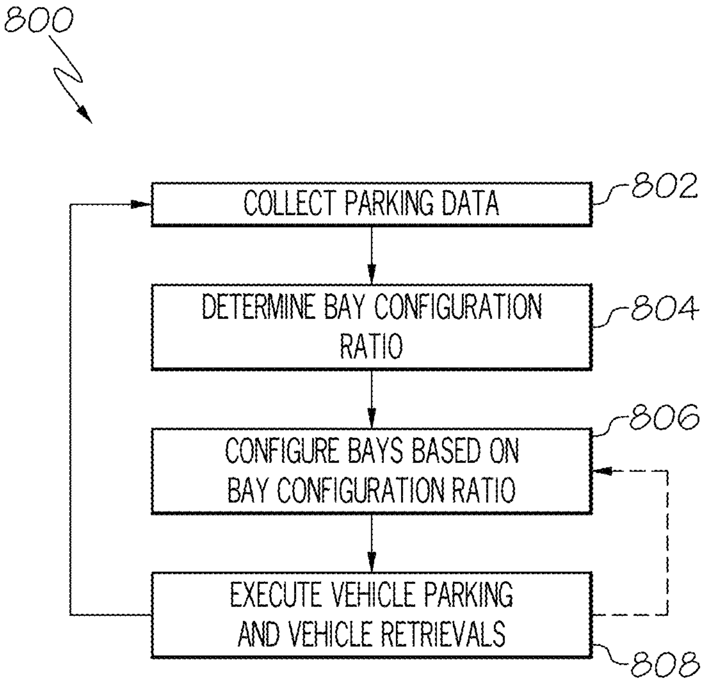
FIG. 8 schematically depicts a flow diagram of a method for configuring bays of the parking system, according to one or more embodiments shown and described herein.

Referring now to FIG. 8, a method 800 for determining a bay configuration ratio and preconfiguring the bays 200 is depicted, according to one or more embodiments shown and described herein. The method 800 is described herein with reference to FIGS. 1-6. Initially, at step 802, the data collection module 508 obtains parking data based on the number of vehicles parked and the number of vehicles retrieved, as well as when each occurs, such as the time of day, day of the week, weather conditions, and other factors.

Once the parking data has been collected, the method 800 proceeds to step 804 at which the bay configuration determination module 510 will identify trends in the parking data and, more specifically, determine the bay configuration ratio. As discussed herein, the bay configuration ratio indicates how many of the bays 200 should be configured into the insert-ready state and how many bays 200 should be configured into the retrieve-ready state based on current demand for parking and retrieving vehicles.

Thereafter, at step 806, the central server 402 sends instructions to each of the bays 200 to be configured into a particular configuration based on the bay configuration ratio determined by the bay configuration determination module 510. As a non-limiting example, if the bay configuration ratio indicates a bay configuration ratio of 80% insert-ready state and 20% retrieve-ready state, then the central server 402 will send instruction to 80% of the bays 200 to be configured into the insert-ready state and 20% of the bays 200 to be configured into the retrieve-ready state. In response to each bay 200 receiving the specific instruction from the central server 402, each bay 200 is configured into the particular configuration.

At step 808, the bays 200 may be utilized to carry out vehicle parking and vehicle retrieval as discussed herein. In doing so, the bays 200 may be positioned out of their initial configuration as vehicles inserted into the bays 200 are parked within the parking garage 108 and other vehicles are retrieved from the bays 200. Accordingly, the method 800 continually returns to step 806 to reconfigure the bays 200 to ensure that the bay configuration ratio remains satisfied. As discussed herein, it may not be necessary for each bay 200 to return to its initial configuration if it is more efficient, i.e., takes less time, to configure other bays 200 so that the total number of bays 200 satisfies the bay configuration ratio. For example, it may not be necessary to reconfigure a bay 200 back into the insert-ready state if another bay 200 previously in the retrieve-ready state can be more efficiently configured into the insert-ready state such that the bay configuration ratio remains the same across all bays 200.

From the above, it is to be appreciated that defined herein are parking systems including a controller configured to receive a parking reservation from a user device identifying that a target vehicle intends to be parked, send instruction to one of a plurality of AGVs to position a tray within a bay to receive the target vehicle in response to receiving the parking reservation, send instruction to one of the AGVs to navigate the target vehicle received within the bay to a target parking space, and send instruction to at least a subset of the AGVs to rearranging the tray carrying the target vehicle based on a pick up time indicated in the parking reservation. The controller may also be configured to determine a bay configuration ratio based on one or more parameters, each bay being configured into one of an insert-ready state or a retrieve-ready state in accordance with the bay configuration ratio, wherein when a bay is in the insert-ready state, a tray is placed within the bay and an outward-facing door of the bay is in an open position, and wherein when a bay is in the retrieve-ready state, the outward-facing door of the bay is in a closed position, an inward-facing door of the bay is in an open position, and no tray is positioned within the bay.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A parking system comprising:

a plurality of bays; and a controller configured to determine a bay configuration ratio based on collected parking data, each bay being configured into one of an insert-ready state and a retrieve-ready state in accordance with the bay configuration ratio, wherein, to position a bay in the insert-ready state, the controller instructs a tray to be placed within the bay and an outward-facing door of the bay is moved to an open position, wherein, to position a bay in the retrieve-ready state, the outward-facing door of the bay is moved to a closed position, an inward-facing door of the bay is moved to an open position, and the controller does not instruct a tray to be positioned within the bay.

2. The parking system of claim 1, wherein the controller is configured to determine the bay configuration ratio based on trends of vehicles being dropped off in the bays and vehicles being picked up from the bays at specific times.

3. The parking system of claim 2, wherein the controller is configured to receive parking data from a presence detection sensor provided in each bay, the presence detection sensor configured to detect the presence of a vehicle within the each, and wherein the bay configuration ratio is determined based on the parking data received from the presence detection sensor.

4. The parking system of claim 2, wherein the bay configuration ratio is determined using a machine learning algorithm.

5. The parking system of claim 2, wherein a recess is formed in a base of the bay, and wherein the outward-facing door is opposite the inward-facing door.

6. The parking system of claim 1, wherein the controller is configured to assign each bay one of the insert-ready state and the retrieve-ready state, and after a vehicle is removed from the bay, instruct the bay to be reconfigured into the one of the insert-ready state and the retrieve-ready state to reestablish the bay configuration ratio.

7. A parking system comprising:

a plurality of bays, each bay including a base having a recess formed therein for receiving a tray; and a controller configured to determine a bay configuration ratio based on collected parking data, each bay being configured into one of an insert-ready state and a retrieve-ready state in accordance with the bay configuration ratio, wherein, to position a bay in the insert-ready state, the controller instructs a tray to be placed within the bay and an outward-facing door of the bay is moved to an open position, wherein, to position a bay in the retrieve-ready state, the outward-facing door of the bay is moved to a closed position, an inward-facing door of the bay is moved to an open position, and the controller does not instruct a tray to be positioned within the bay.

8. The parking system of claim 7, wherein an upper surface of the platform is flush with an upper surface of the base when the tray is positioned within the recess formed in the base of the bay.

9. The parking system of claim 7, wherein the controller is configured to determine the bay configuration ratio based on trends of vehicles being dropped off in the bays and vehicles being picked up from the bays at specific times.

10. The parking system of claim 9, wherein the controller is configured to receive parking data from a presence detection sensor provided in each bay, the presence detection sensor configured to detect the presence of a vehicle within the each, and wherein the bay configuration ratio is determined based on the parking data received from the presence detection sensor.

11. The parking system of claim 9, wherein the bay configuration ratio is determined using a machine learning algorithm.

12. The parking system of claim 9, wherein the bay is positioned at a perimeter of a parking garage such that the inward-facing door is adjacent the parking garage and the outward-facing door is opposite the inward-facing door.

13. The parking system of claim 7, wherein the controller is configured to assign each bay one of the insert-ready state and the retrieve-ready state, and after a vehicle is removed from the bay, instruct the bay to be reconfigured into the one of the insert-ready state and the retrieve-ready state to reestablish the bay configuration ratio.

14. A method comprising:

determining a bay configuration ratio based on collected parking data; and positioning a plurality of bays in one of an insert-ready state and a retrieve-ready state in accordance with the bay configuration ratio.

15. The method of claim 14, further comprising determining the bay configuration ratio based on trends of vehicles being dropped off in the bays and vehicles being picked up from the bays at specific times.

16. The method of claim 14, further comprising:

receiving the collected parking data from a presence detection sensor provided in each bay, the presence detection sensor configured to detect the presence of a vehicle within the each; and determining the bay configuration ratio based on the collected parking data received from the presence detection sensor.

17. The method of claim 14, further comprising determining the bay configuration ratio using a machine learning algorithm.

18. The method of claim 14, further comprising assigning each bay one of the insert-ready state and the retrieve-ready state, and after a vehicle is removed from the bay, reconfiguring the bay into the one of the insert-ready state and the retrieve-ready state to reestablish the bay configuration ratio.

* * * * *